United States Patent
Kim et al.

(10) Patent No.: US 9,792,909 B2
(45) Date of Patent: *Oct. 17, 2017

(54) METHODS AND SYSTEMS FOR RECOMMENDING DIALOGUE STICKER BASED ON SIMILAR SITUATION DETECTION

(71) Applicant: NCsoft Corporation, Seoul (KR)

(72) Inventors: Taek Jin Kim, Seongnam (KR); Jay June Lee, Seoul (KR); Jungsun Jang, Seoul (KR); Sehee Chung, Yongin (KR); Kyeong Jong Lee, Yongin (KR); Yeonsoo Lee, Seoul (KR)

(73) Assignee: NCSOFT CORPORATION, Seoul (KR)

( * ) Notice: Subject to any disclaimer, the term of this patent is extended or adjusted under 35 U.S.C. 154(b) by 75 days.

This patent is subject to a terminal disclaimer.

(21) Appl. No.: 14/799,560

(22) Filed: Jul. 14, 2015

(65) Prior Publication Data
US 2016/0210117 A1    Jul. 21, 2016

(30) Foreign Application Priority Data
Jan. 19, 2015    (KR) ........................ 10-2015-0008727

(51) Int. Cl.
*G06F 17/27* (2006.01)
*G10L 15/26* (2006.01)
(Continued)

(52) U.S. Cl.
CPC .......... *G10L 15/26* (2013.01); *G06F 17/2785* (2013.01); *H04L 51/32* (2013.01); *H04M 1/72547* (2013.01)

(58) Field of Classification Search
CPC ... G06F 17/27; G06F 17/276; G10L 15/1822; H04L 51/32
(Continued)

(56) References Cited

U.S. PATENT DOCUMENTS 8,458,278 B2 * 6/2013 Christie ............... G06Q 10/107
  709/207
9,042,923 B1 * 5/2015 Mirho ..................... H04W 4/14
  455/412.1
(Continued)

FOREIGN PATENT DOCUMENTS

KR  10-0751396 B1  5/2007
KR  10-0751396 A   8/2007
(Continued)

OTHER PUBLICATIONS

Yeon-Su Lee, et al. "A method for measuring Inter-Utterance Similarity Considering Various Linguistic Features," Korean Sound Conference, vol. 28, Book 1, pp. 61-69 (2009).
(Continued)

*Primary Examiner* — Olujimi Adesanya
(74) *Attorney, Agent, or Firm* — Patent Office of Dr. Chung Park

(57) ABSTRACT

Provided is a method of recommending a dialogue sticker through similar situation retrieval. The method includes: generating dialogue situation information on the last utterances of the first user terminal and the second user terminal; retrieving a candidate situation having the most similar context from a dialogue situation information database, the situation including a plurality of continuous utterances; acquiring sticker information from pairs of utterance-sticker derived from the retrieved candidate situation and providing the sticker information for the first user terminal.

4 Claims, 14 Drawing Sheets

(51) Int. Cl.
*H04L 12/58* (2006.01)
*H04M 1/725* (2006.01)

(58) Field of Classification Search
USPC .............................................................. 704/9
See application file for complete search history.

(56) References Cited

U.S. PATENT DOCUMENTS

| | | | | |
|---|---|---|---|---|
| 2002/0077135 A1* | 6/2002 | Hyon | ................ | H04M 1/72544 455/466 |
| 2006/0122834 A1* | 6/2006 | Bennett | ............... | G10L 15/1822 704/256 |
| 2007/0073517 A1* | 3/2007 | Panje | ................ | H04M 1/72552 702/181 |
| 2008/0059570 A1* | 3/2008 | Bill | ........................ | G06Q 10/10 709/203 |
| 2009/0019117 A1* | 1/2009 | Bonforte | .............. | G06Q 10/107 709/206 |
| 2009/0061825 A1* | 3/2009 | Neelakantan | ..... | H04L 29/12292 455/412.1 |
| 2011/0222788 A1* | 9/2011 | Tsunokawa | ............. | G06F 17/27 382/229 |
| 2013/0151508 A1* | 6/2013 | Kurabayashi | ....... | G06F 17/2223 707/723 |
| 2013/0218914 A1* | 8/2013 | Stavrianou | ........ | G06F 17/30654 707/755 |
| 2013/0297608 A1* | 11/2013 | Etoh | ................. | G06F 17/30035 707/737 |
| 2014/0067375 A1* | 3/2014 | Wooters | ................ | G06F 17/279 704/9 |
| 2014/0156360 A1* | 6/2014 | Shalita | ............... | G06Q 30/0255 705/14.1 |
| 2014/0214409 A1* | 7/2014 | Leydon | ................. | G06F 3/0236 704/9 |
| 2015/0149925 A1* | 5/2015 | Weksler | ................ | H04L 51/063 715/752 |
| 2015/0220774 A1* | 8/2015 | Ebersman | .......... | G06K 9/00308 382/118 |
| 2015/0286371 A1* | 10/2015 | Degani | ................. | G06F 17/274 705/14.64 |
| 2016/0132490 A1* | 5/2016 | Lee | ..................... | G06F 17/2785 704/9 |
| 2016/0210116 A1* | 7/2016 | Kim | ..................... | G06F 17/276 |
| 2016/0210962 A1* | 7/2016 | Kim | ....................... | G06F 17/27 |
| 2016/0210963 A1* | 7/2016 | Kim | .................... | G10L 15/1822 |

FOREIGN PATENT DOCUMENTS

| | | |
|---|---|---|
| KR | 10-2011-0026218 A | 3/2011 |
| KR | 10-2012-0109943 A | 10/2012 |

OTHER PUBLICATIONS

Gumwon Hong et al., "A Korean Mobile Conversational Agent System," Korea Computer Science Conference, vol. 13, Book 6, 2008.

Kim, Jun Hyun et al. "Automated Emotion Recommendation Module Based on Bigram-Signature Using Text Mining," Korean Computer Conference, pp. 1632-1634, 2014.

* cited by examiner

FIG. 4

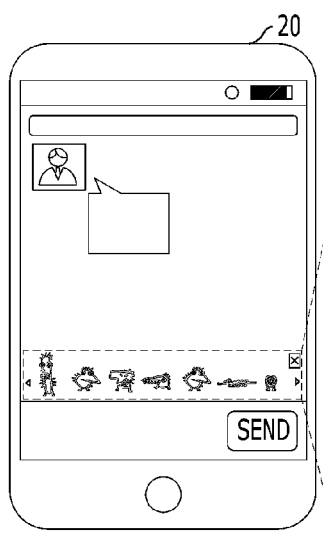

☐ RECOMMENDATION EXAMPLE #1:
   RELATION WITH THE OTHER PARTY
   ▫ WHEN THE OTHER PARTY IS A SUPERIOR

▫ WHEN THE OTHER PARTY IS A CLOSE FRIEND

☐ RECOMMENDATION EXAMPLE #2: DIALOGUE EMOTION
   WHEN A USER TALKS ABOUT HARD WORK TO A SUPERIOR

☐ RECOMMENDATION EXAMPLE #3: DIALOGUE SITUATION
   APPROPRIATE RESPONSE TO UTTERANCE OF THE
   OTHER PARTY WHEN FRIEND SAYS TO GIVE A TREAT

☐ RECOMMENDATION EXAMPLE #4: PERSONAL PREFERENCE
   USER WHO MAINLY USE STICKERS
   EXPRESSED AS OVERACTION

METHODS AND SYSTEMS FOR RECOMMENDING DIALOGUE STICKER BASED ON SIMILAR SITUATION DETECTION

CROSS-REFERENCE TO RELATED APPLICATIONS

This U.S. non-provisional patent application claims priority under 35 U.S.C. §119 of Korean Patent Application No. 10-2015-0008727, filed on Jan. 19, 2015, the entire contents of which are hereby incorporated by reference.

BACKGROUND OF THE INVENTION

The present invention disclosed herein relates to a method of recommending stickers during a dialogue through a social network service or an instant messenger, and more particularly, to a method of recommending an appropriate sticker in the light of dialogue situation by retrieving similar situations considering context from a dialogue situation database that is already constructed.

Emoticons are being used to express the emotional state of a user during a dialogue through a social network service or an instant messenger.

In the past, emoticons (e.g., OTL, TT, ^^, etc.) written with texts was added to the end of the utterance, but in recent years, emoticons of graphic image types are being widely used. Hereinafter, the term "utterance" refers to at least one of text and image.

While inputting dialogue contents, a user opens an emoticon selection window and then selects and inputs an appropriate emoticon. In order to more conveniently perform the foregoing process, a technology of automatically converting and expressing a text inputted by a user into an emoticon has been also developed.

FIG. 1 is a view illustrating an emoticon displayed on a well-known personal computer messenger (NateOn).

In the well-known messenger shown in FIG. 1, when a specific keyword is inputted, the corresponding text is automatically converted into an emoticon corresponding to the specific keyword. In FIG. 1, when a user inputs a word "present", it can be seen that the word "present" is automatically converted into the emotion corresponding to the present.

However, when a specific keyword is simply inputted, this related art technology merely expresses an emoticon matched with the specific keyword in advance. Accordingly, in many cases, emoticons are expressed in regardless of dialogue contents or contexts, even in an inappropriate manner in the light of the dialogue situation.

In order to overcome these limitations, Korean Patent Application Publication No. 10-2011-0026218 discloses "apparatus and method for inputting text message and its program stored in recording medium", which extract words indicating the emotional state from dialogue contents that are inputted, and select an emoticon matching with the emotional state using the extracted words.

However, this technology is also merely to match the keyword with the corresponding emoticon one-to-one by analyzing inputted texts when keywords representing the emotional state such as happiness and sadness show.

Accordingly, since the context or dialogue situation and relationship between users are not considered, inappropriate emoticons may be recommended.

In addition, the Korea Computer Science Conference paper, Vol. 13, Book 6, 2008, entitled "A Korean Mobile Conversational Agent System", discloses a method of calculating the similarity between sentences.

However, the technology disclosed in this paper is merely to calculate the similarity of utterances without consideration of the context.

In other words, since the technology adopts mechanical similarity calculation single utterances, not similarity comparison between dialogues including a plurality of utterances, there is a limitation in that the technology is difficult to apply to the emoticon recommendation considering context.

PRIOR ART DOCUMENT

Patent Document

Document 1. Korean Patent Application Publication No. 10-2011-0026218 entitled "Apparatus and method for inputting text message and its program stored in recording medium"

Document 2. Korean Patent No. 10-0751396 entitled "System and method for auto conversion emoticon of SMS in mobile terminal"

Non-Patent Document

Document 3. Jun-Hyuk Kim, Young-Woong Park, Seul-Bi Ha, and Yong-Seok Choi, "Automated Emotion Recommendation Module Based on Bigram-Signature Using Text Mining", Korean Computer Conference, PP 1632-1634, 2014.

Document 4. Yeon-Su Lee, Joong-Hui Shin, Gum-Won Hong, Young-In Song, Do-Gil Lee, and Hae-Chang Rim, "A Method for Measuring Inter-Utterance Similarity Considering Various Linguistic Features", Korean Sound Conference, Vol. 28, Book 1, PP 61-69 (2009).

Document 5. GumWon Hong, Yeon-Soo Lee, Min-Jeong Kim, Seung-Wook Lee, Joo-Young Lee, and Hae-Chang Rim, "A Korean Mobile Conversational Agent System", Korea Computer Science Conference, Vol. 13, Book 6, 2008.

SUMMARY OF THE INVENTION

The present invention provides a method of understanding dialogue situation and emotion state by the unit of dialogue, not by the unit of utterance and selecting and recommending an appropriate sticker in consideration of context in a messenger or a social network service in which long-distance users exchange dialogues with each other.

The present invention also provides a method of recommending a sticker used in the past situation similar to the context of the current dialogue, by retrieving similar situations from a dialogue situation information database that is already constructed and determining the ranking of candidate pairs of utterance-sticker.

Embodiments of the present invention provide methods of recommending a dialogue sticker through similar situation retrieval, include: by a server connected to a first user terminal and a second user terminal through a network, generating dialogue situation information on the last utterances of the first user terminal and the second user terminal; retrieving a candidate situation having the most similar context from a dialogue situation information database, the situation including a plurality of continuous utterances; acquiring sticker information from pairs of utterance-sticker derived from the retrieved candidate situation and providing the sticker information for the first user terminal.

In some embodiments, the dialogue situation information database may include the pairs of utterance-sticker and dialogue situation information on the plurality of continuous utterances that are already analyzed.

In other embodiments, the generating of the dialogue situation information may include generating dialogue situation information including dialogue act category information on a certain number of continuous utterances including the last utterance and exchanged between the first user terminal and the second user terminal.

In still other embodiments, the retrieving of the candidate situation may include retrieving a situation having continuous utterances matching with the flow of dialogue act of the inputted last utterance from the dialogue situation information database.

In even other embodiments, the method may include determining the ranking of the candidate situation in accordance with a dialogue act flow prediction criteria that are already defined in regard to the retrieved similar situation. Here, the providing of the sticker information for the first user terminal may include preferentially providing sticker information acquired from a high-ranked candidate situation.

In yet other embodiments, the method may further include determining whether there is an utterance speaker switching when determining accordance of the flow of dialogue act in regard to the plurality of continuous utterances.

In further embodiments, the retrieving of the candidate situation may include inferring a relationship between the first user and the second user from the dialogue situation information of the inputted last utterance and retrieving a situation matching with the relationship between the first user and the second user from the dialogue situation information database.

In still further embodiments, after the generating of the dialogue situation information, the method may further include: determining whether or not the dialogue situation information that is analyzed meets event rules that are already defined; and proceeding to retrieving of the candidate situation when the event rules are not met, and withdrawing sticker information stored in association with the corresponding rules for the first user terminal so as to provide the sticker information and finish the procedure when the event rules are met.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 4 is a view illustrating examples of recommending stickers in consideration of relation with the other dialogue party, dialogue emotion, dialogue situation, and personal preference;

DETAILED DESCRIPTION OF PREFERRED EMBODIMENTS

Figure 1:
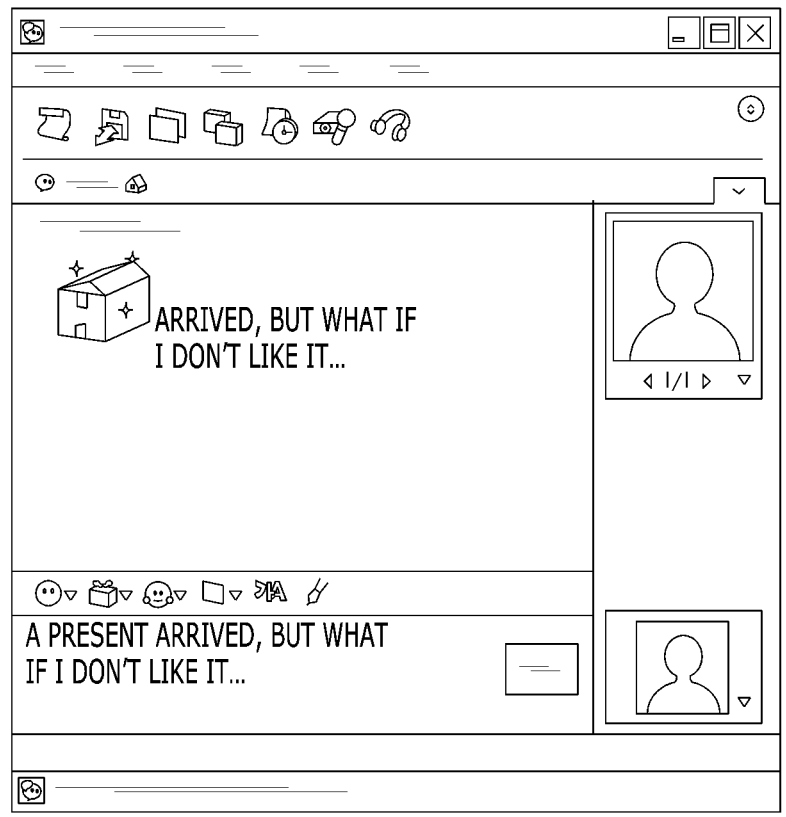
FIG. 1 is a view illustrating a typical automatic emoticon conversion technology.

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Hereinafter, exemplary embodiments of the present invention will be described in detail with reference to the accompanying drawings. In order to clarify the present invention, a description irrelevant to the constitution of the present invention will be omitted, and in the drawings, like reference numerals refer to like elements throughout.

Since the terms "including", "comprising", and "having" can be construed as encompassing corresponding components unless specially described as opposite, it should be understood that they do not exclude other components but encompass other components. Unless defined otherwise, all technical and scientific terms have the same meanings as commonly understood by those skilled in the art to which the present invention belongs.

In the detailed description of the invention and claims, components named as "~unit", "~part", "~module", and "~block" mean units that process at least one function or operation, and each of which can be implemented by software, hardware, or a combination thereof.

Hereinafter, a sticker denotes a graphic image attached to dialogue contents for use during a dialogue on a messenger or social network service. The sticker can be used interchangeably with an emoticon.

Hereinafter, an attached sticker denotes a sticker that accompanies a dialogue sentence inputted by a user and is attached to the inputted sentence.

Hereinafter, a responsive sticker denotes a sticker used to respond to a sticker used by the other party in the last dialogue or the last dialogue contents inputted by the other party.

The attached sticker may be a sticker recommended for a dialogue sentence inputted by the other party, and the responsive sticker may be a sticker recommended for a user (not the other party) in order to respond to a sticker used by the other party or the last dialogue sentence inputted by the other party.

Hereinafter, the attachment of a sticker denotes expressing the graphic image of the corresponding sticker at the front or rear of a dialog box or inputted dialogue contents or in the middle of the dialog box or inputted dialogue contents.

Hereinafter, an utterance denotes a basic unit of dialogue inputted by a user on a messenger or a social network service. Generally, the utterance may be performed by inputting dialogue contents in a form of text into a dialogue input window and then pushing a button "Send".

Hereinafter, a dialogue situation denotes a state flow of dialogue which emerges through the intention of utterance, emotion, and keyword analysis.

Hereinafter, a speech act denotes the intention of utterance.

Hereinafter, dialogue situation information, which is information obtained through dialogue act analysis, emotion analysis, and surface analysis on utterances, includes dialogue act information (information on dialogue act category), emotion information (information on emotion category and emotion strength), and keywords. The dialogue situation information may be generated from a single utterance, but preferably, may include dialogue act flow and emotion flow in regard to two or more continuous utterances.

Hereinafter, a dialogue situation information database denotes a database that stores a large amount of dialogue situation information through machine learning to dialogue act attachment corpuses and emotion attachment corpuses. The dialogue situation information database may include dialogue situation information on continuous utterances and pairs of utterance-sticker for each utterance.

Figure 2:
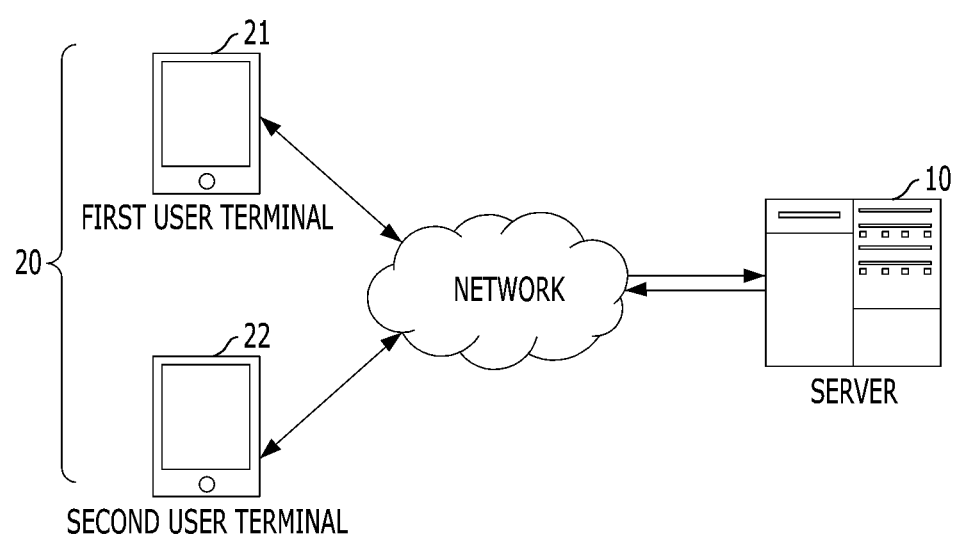
FIG. 2 is a view illustrating a relationship of a server and user terminals.

FIG. 2 is a view illustrating a relationship of a user terminal 20 and a server 10.

The user terminal 20 may be connected to the server 10 through a network, and may correspond to a unit for inputting dialogue contents or expressing an utterance inputted from the other party.

A user may exchange a visual form of messages including texts and images with other users via the server 10 using the user terminal 20.

Examples of the user terminal 20 may include smart phones and personal computers as the unit for performing the foregoing functions. In addition, units that can be connected to the network (e.g., Internet) and enable a visual type of communication for a user should be construed as being included in the user terminal 20.

Hereinafter, a first user may be in dialogue with the other party by exchanging messages with the other party, and a first user terminal 21 may correspond to a unit that enables the first user to perform the visual type of communication.

A second user may be the other part in dialogue with the first user, and a user terminal 22 may be a terminal used by the second user for dialogue.

The server 10 may relay messages between the first user and the second user, and furthermore, may recommend a responsive sticker to the first user such that the first user can conveniently respond to an utterance of the second user.

Hereinafter, it will be described that the server 10 recommends stickers to the first user, but this distinguishment between the first user and the second user is merely for better understanding as a matter of convenience. Accordingly, it is natural that the server 10 can recommend stickers to both users.

In FIG. 2, although only a single server is shown, a server group including a plurality of servers divided in accordance with functions thereof may be provided.

For example, the server 10 may also include a messenger server for relaying a dialogue between the first user terminal 21 and the second user terminal 22, a sticker recommendation server for analyzing a dialogue and recommending stickers, and a server for providing a social network service.

Also, the server 10 may be connected to an external social network service server in order to provide a sticker recommendation result for the user terminal 20 via the external server.

The responsive sticker recommendation method according to the embodiment of the present invention may be executed in the server 10 connected to the first user terminal 21 and the second user terminal 22 as described above.

Figure 3:
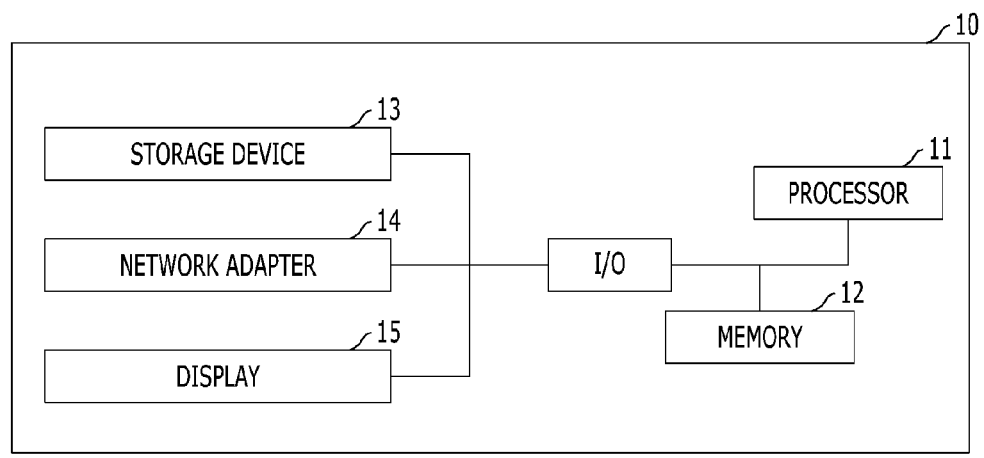
FIG. 3 is a view illustrating the configuration of a server.

FIG. 3 illustrates the hardware structure of the server.

As shown in FIG. 3, the server 10 may include a processor 11, a memory 12, a storage unit 13, and a network adapter 14.

The storage unit 13 may be loaded with already-analyzed utterance data and computer programs recorded with commands for executing the responsive sticker recommendation method of the present invention.

The memory 12 may correspond to a storage space for storing commands of the computer program, and the processor 11 may execute the commands loaded on the memory to execute the responsive sticker recommendation method of the present invention.

The network adapter 14 may communicate with the first user terminal 21 and the second user terminal 22 through wired/wireless communication methods.

The server 10 may select and recommend appropriate stickers during the dialogue of users through the following process.

First, the server 10 may collect dialogue contents from the first user terminal 21 and the second user terminal 20, and may analyze the dialogue situation by segmenting and analyzing an utterance.

Meanwhile, the server 10 may select an appropriate sticker candidate group by retrieving similar dialogue situations from utterance data which are already collected and analyzed using the established dialogue situation classification system and dialogue situation information, and may determine the ranking of stickers based on the situation and preference and finally recommend stickers to a user.

That is, unlike a related art in which one-to-one matching (recommending identical sticker in regard to identical keyword) is performed through simple comparison of keywords, even though identical keyword is checked from the parsing of dialogue contents, different stickers may be recommended in accordance with the dialogue situation, relation with the other party, or personal preference of a user.

FIG. 4 is a view illustrating examples of recommending, by the server 10, different sticker groups in accordance with the relation with the other party, dialogue emotion, dialogue situation, and personal preference in spite of identical dialogue contents.

In Example #1 of FIG. 4, when the other dialogue party is a superior or a close friend, it can be seen that different sticker groups are recommended.

In case of a superior, stickers giving an excessively unceremonious feeling may be excluded, and stickers appropriate for dialogue with a superior may be mainly recommended.

On the other hand, when the other party is a close friend, stickers that can be used conveniently instead of sticking to formality may be mainly recommended.

In Example #2 of FIG. 4, an appropriate sticker group may be recommended in accordance with the emotional state of a user.

When a user talks about hard and sad company works, the server 10 may catch the emotional state of a user, and may recommend a sticker group matching with the emotional state as shown in Example #2 of FIG. 3.

In Example #3 of FIG. 4, an appropriate sticker group may be recommended in accordance with the dialogue situation.

When the other dialogue party says to give a treat at the last inputted dialogue contents, stickers appropriate for the talk of the other dialogue party may be recommended as the dialogue contents of a user.

In Example #4 of FIG. 4, the ranking of selected sticker groups may be again determined and then recommended in accordance with the personal preference.

From the analysis of metadata of stickers that are much used at ordinary times by a user, if a user mainly use stickers expressed as overaction, then the server 10 may correct and provide a sticker group for the first user terminal 21 such that stickers expressed as overaction can be preferentially exposed among the sticker group selected in consideration of the dialogue situation, the relation with the other party, and the emotional state.

Figure 5:
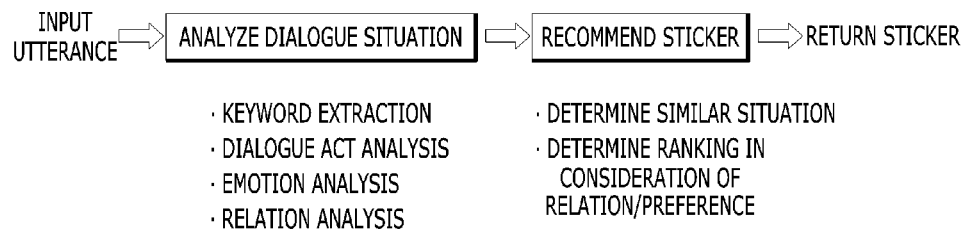
FIG. 5 is a view illustrating a process of recommending stickers by analyzing collected utterances.

As shown in FIG. 5, these series of sticker recommendation processes may be roughly divided into a dialogue situation analysis process and a sticker recommendation process.

FIG. 5 is a view illustrating a process of recommending stickers by analyzing collected utterances.

In the dialogue situation analysis process, through natural language processing, colloquial style of sentences may be corrected, and morphemes may be analyzed. Also, parts of speech may be attached. The correction of colloquial style of sentences, the analysis of morphemes, and the attachment of parts of speech may refer to well-known researches.

The dialogue act analysis and the emotion analysis may be performed using classified words and corpuses.

Also, the relationship between dialogue parties may be analyzed through the analysis on pairs of dialogues that are exchanged.

"Dialogue act", i.e., intention of utterance may be classified into various types from the general-purpose or social formality viewpoint of dialogue. For example, the intention may be classified into "praise", "help request", "greeting", and "boast".

"Emotion" may be divided into various categories according to the degree of emotion. For example, the emotion may be classified into categories such as "happiness" and "sadness", and may be divided in accordance with the degree of emotion such as "very", "normally", and "slightly".

"Relation" may be classified in accordance with the relationship between subordinates and superiors and the degree of intimacy. For example, the relation may be classified into "superior", "subordinate", "familiarity", and "unfamiliarity".

When the dialogue situation is analyzed through the foregoing process, the server 10 may retrieve the most similar dialogue situation from the dialogue situation information database in the sticker recommendation process.

The similar situation may be mainly determined based on the dialogue act flow (mainly defining context), and the emotion information or the user relationship may be overall considered.

Hereinafter, these series of processes will be described in detail with reference to the accompanying drawings.

First, in the dialogue situation analysis process, the server 10 may not analyze only a single utterance, but also may analyze the flow of two-way dialogue between dialogue parties.

The dialogue situation analysis process may be further divided into an utterance unit analysis process and a dialogue unit analysis process.

In the utterance analysis process, the analysis of vocabulary level may be performed regardless of the context.

In the utterance analysis process, colloquial style of sentences may be first corrected. In the correction of the colloquial style of sentences, word spacing, misspelling and slang may be corrected. Emoticons may be recognized to be converted into vocabularies corresponding thereto.

Meanwhile, morpheme analysis and attachment of parts of speech may be performed, and thus keywords may be extracted.

Thereafter, in the dialogue unit analysis process, dialogue act analysis, emotion analysis, and relation analysis may be performed. Thus, the server 10 may generate dialogue situation information.

In the dialogue unit analysis process, the analysis may be performed in consideration of the two-way dialogue context, not the utterance unit, and the situation classification system that is already constructed during the dialogue unit analysis may be used.

Figure 6A:
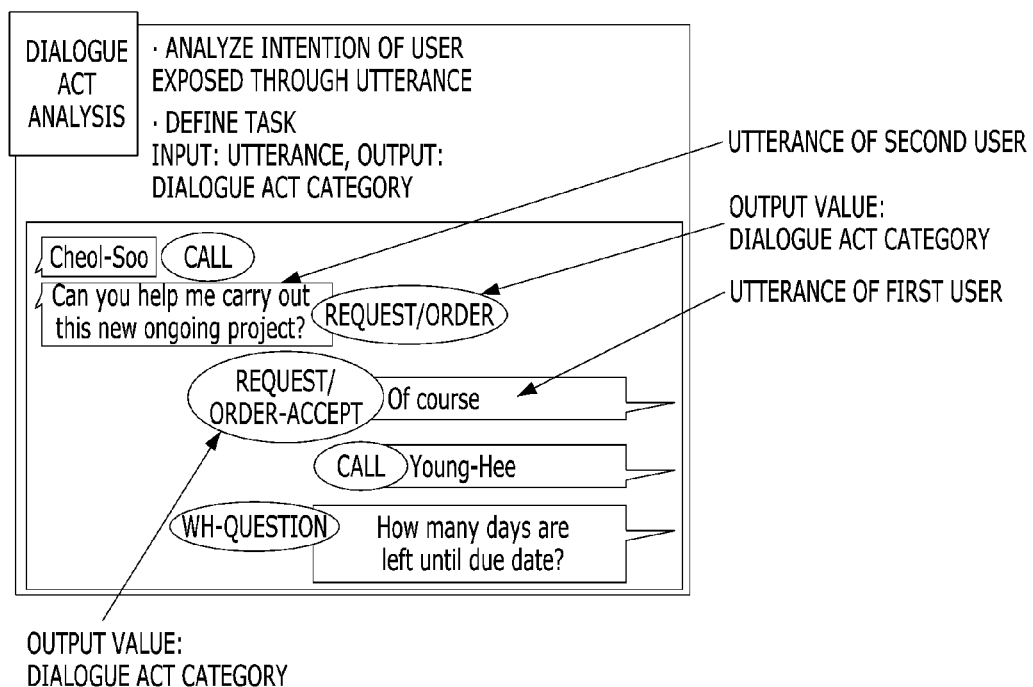
FIG. 6A to 6C are views illustrating dialogue act analysis, emotion analysis, and relation analysis, respectively.
Figure 6B:
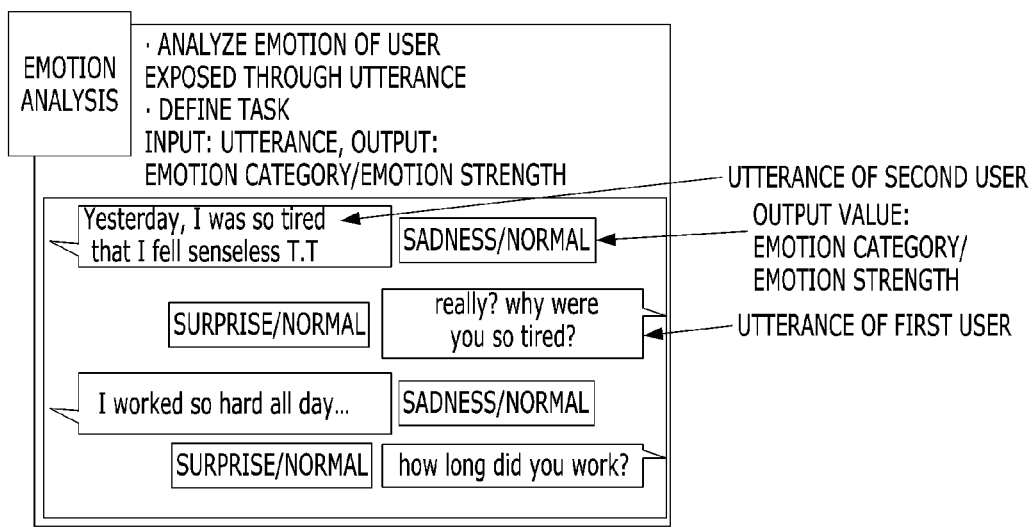
Figure 6C:
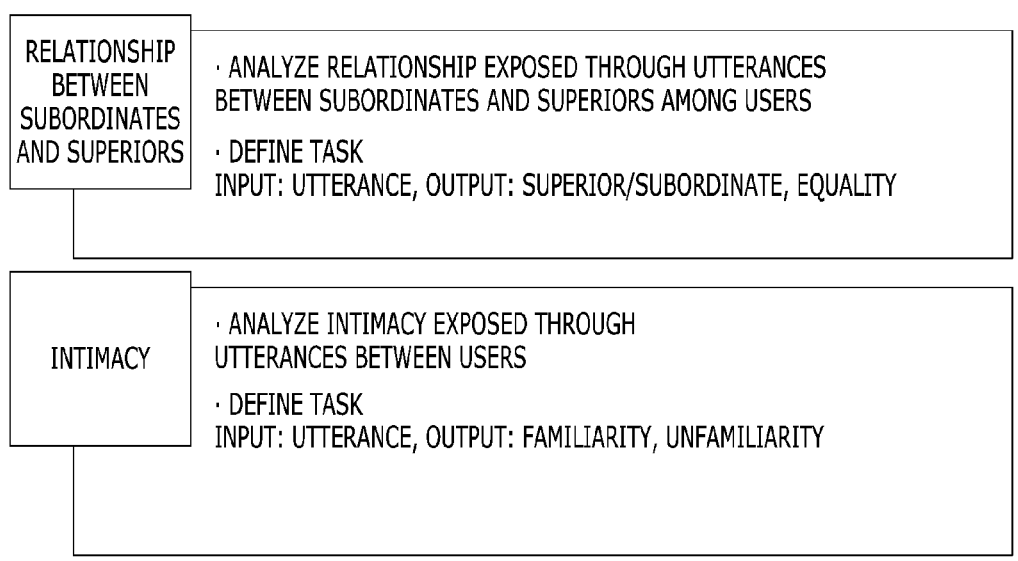

FIG. 6A to 6C are views illustrating dialogue act analysis, emotion analysis, and relation analysis, respectively.

As shown in FIG. 6A, the intention of a user, exposed through utterances, may be analyzed in the dialogue act analysis process.

The input value may be "utterance", and the output value may be "dialogue act category".

In FIG. 6A, when the first user inputs an utterance "Can you help me carry out this new ongoing project?", it can be seen that the output value corresponding thereto is "request/order" that is one of predefined dialogue act categories.

As shown in FIG. 6B, the emotion of a user, exposed through utterances, may be analyzed in the emotion analysis process.

The input value may be "utterance", and the output value may be "emotion category and emotion degree".

In FIG. 6B, when the first user inputs an utterance "Yesterday, I was so tired that I fell senseless. TT", it can be seen that the output value corresponding thereto is "sadness" and "normal". That is, the emotion category may be analyzed as "sadness", and the emotion degree may be analyzed as "normal".

As shown in FIG. 6C, the relationship between subordinates and superiors and the intimacy between users, which are exposed through utterances, may be analyzed in the relation analysis process.

The input value may be "utterance", and the output value of the analysis result on the relationship between subordinates and superiors may be "subordinates and superiors" or "equality". The output value of the analysis result on the intimacy may be "familiarity" or "unfamiliarity".

The dialogue situation classification system may be used for the dialogue act analysis or the emotion analysis.

The dialogue situation classification system may be divided into a dialogue act classification system and an emotion classification system.

The dialogue act classification system may be obtained by classifying the dialogue act, i.e., intention of dialogue into various types from the general-purpose or social formality viewpoint of dialogue.

Figure 7:
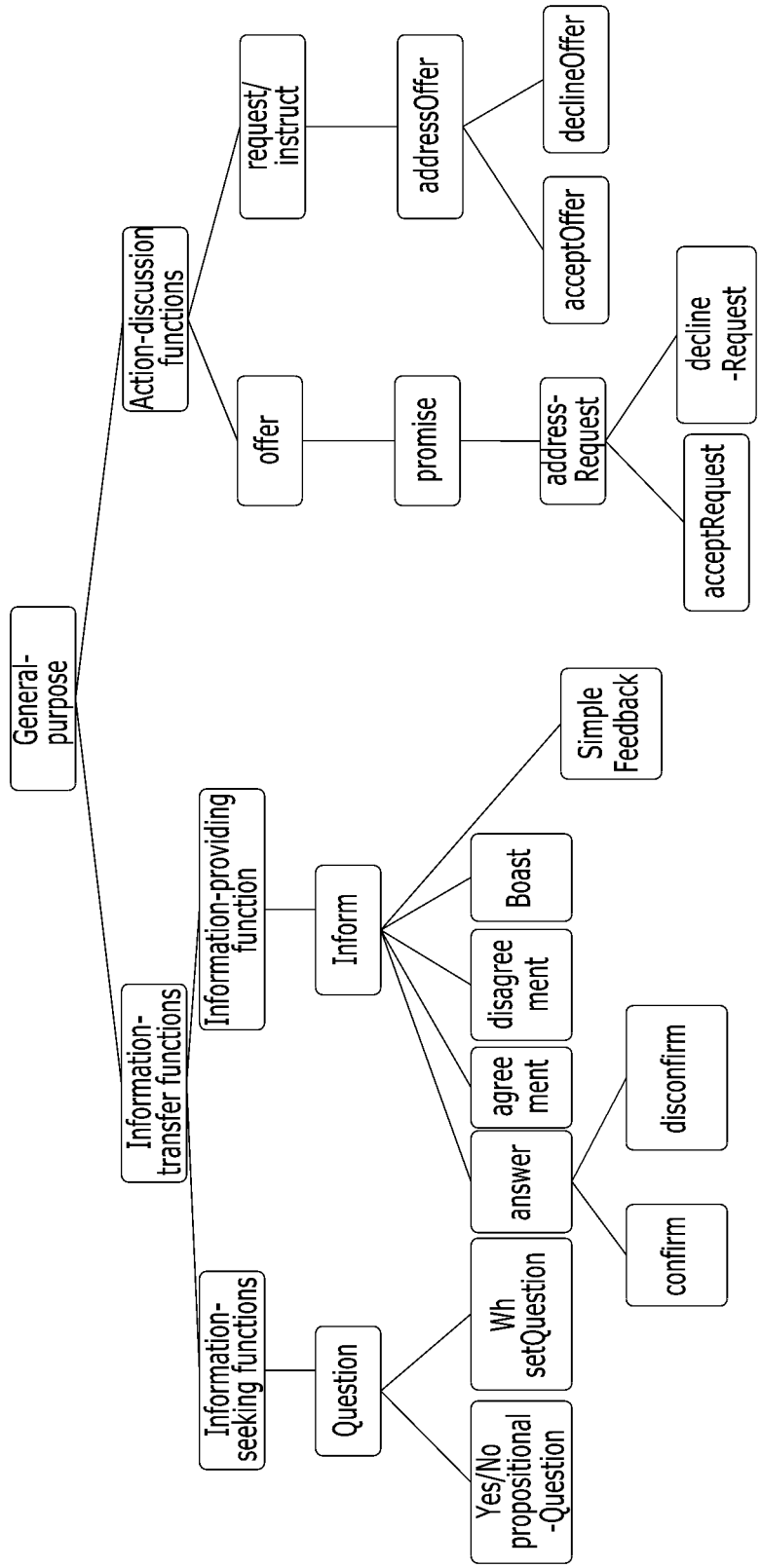
FIG. 7 is a view illustrating a classification system of dialogue acts from the general-purpose viewpoint of dialogue.

FIG. 7 is a view illustrating a classification system of dialogue acts from the general-purpose viewpoint of dialogue.

As shown in FIG. 7, the types such as "Yes-No question", "Wh-question", "Answer-confirm", "Answer-disconfirm", "Agreement", "Disagreement", and "Boast" may be shown.

In FIG. 7, the dialogue act classification system may reflect the hierarchical structure and the classification standards of ISO standard classification system, and may be established so as to comply with Korean language dialogue intention classification. The classification corresponding to emotion may be removed from the dialogue act classification system.

Figure 8:
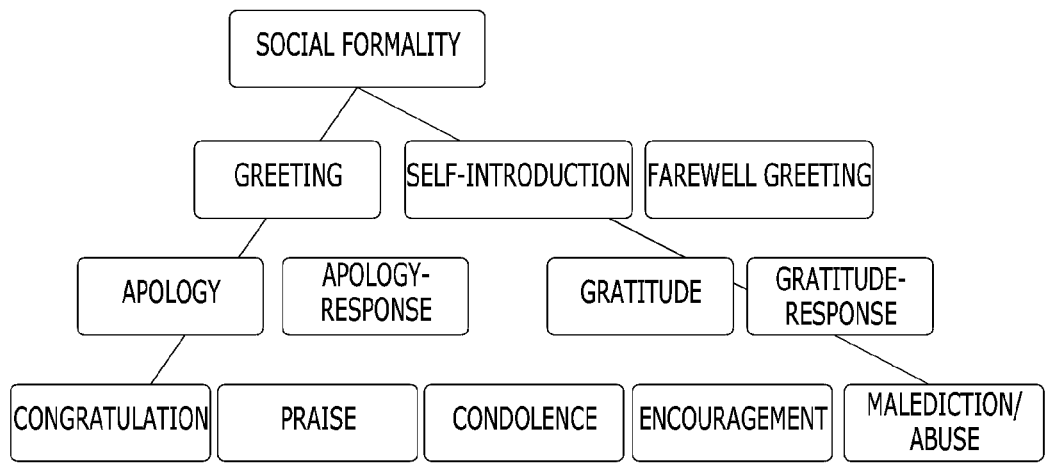
FIG. 8 is a view illustrating a classification system of dialogue acts from the viewpoint of social formality.

The dialogue act classification system of FIG. 8 may be a separate classification system obtained by considering factors of the dialogue attitudes frequently emerging in a messenger service, in addition to the dialogue general-purpose classification system of FIG. 7.

In FIG. 8, the factors of the dialogue attitudes may include "greeting", "apology", "gratitude", "congratulation", "condolence", "encouragement", and "malediction".

The dialogue act classification system of FIG. 7 may correspond to a classification system of modalities of dialogue.

Figure 9:
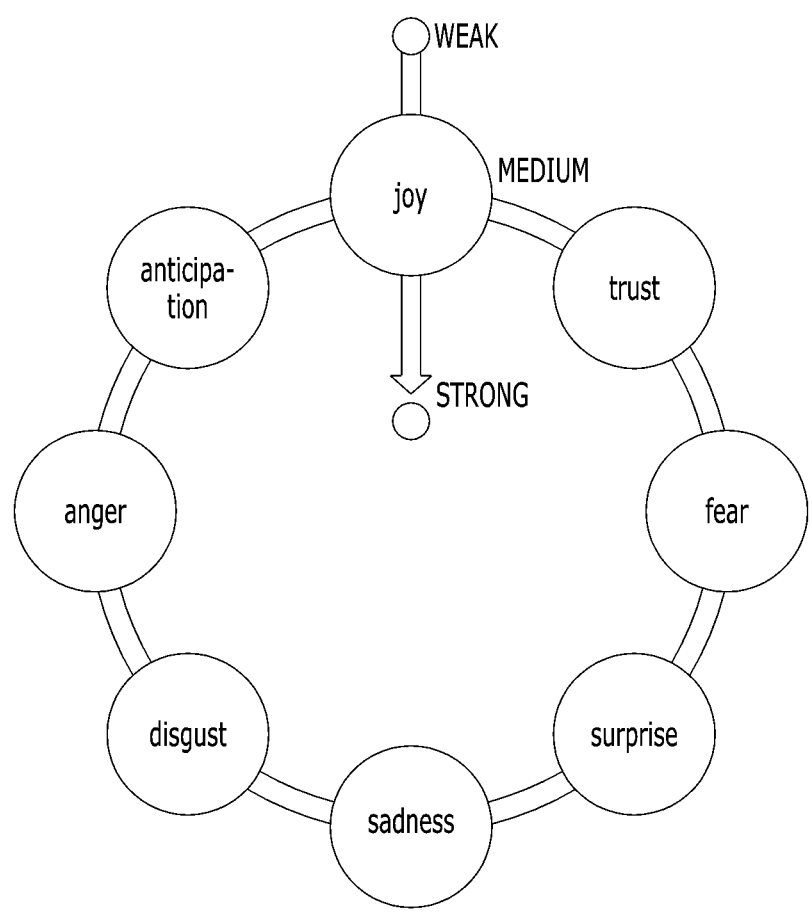
FIG. 9 is a view illustrating a classification system of emotion according to type and degree.

FIG. 9 is a view illustrating a classification system of emotion according to type and degree.

The emotion classification system of FIG. 9 may be obtained by referring to well-known emotion classification models, and may be divided into nine emotion categories including "neutral emotion", i.e., emotionless state.

Here, each emotion category may be divided into strong, medium, and weak in accordance with the emotion degree.

Next, in the sticker recommendation process, the server 10 may retrieve similar situations from the dialogue situation information database using the dialogue situation information of the analyzed utterance.

As shown in FIG. 5, the sticker recommendation process may include a similar situation retrieval process and a relationship and preference-based ranking determination process.

In the similar situation retrieval process, the most similar situation may be selected from utterance data that are already analyzed and stored based on the most probable dialogue act flow using the dialogue situation information.

Also, it may be determined whether an utterance starts a theme or corresponds to a response.

Each situation may be beforehand matched with sticker candidate groups according to whether an utterance starts a theme or corresponds to a response. In the preference-based ranking determination process, the ranking of the matched sticker candidate groups may be determined.

Appropriate stickers may be preferentially exposed according to the suitability based on the relationship with the other party, and may be preferentially exposed according to the suitability based on the preference of a user.

Figure 10:
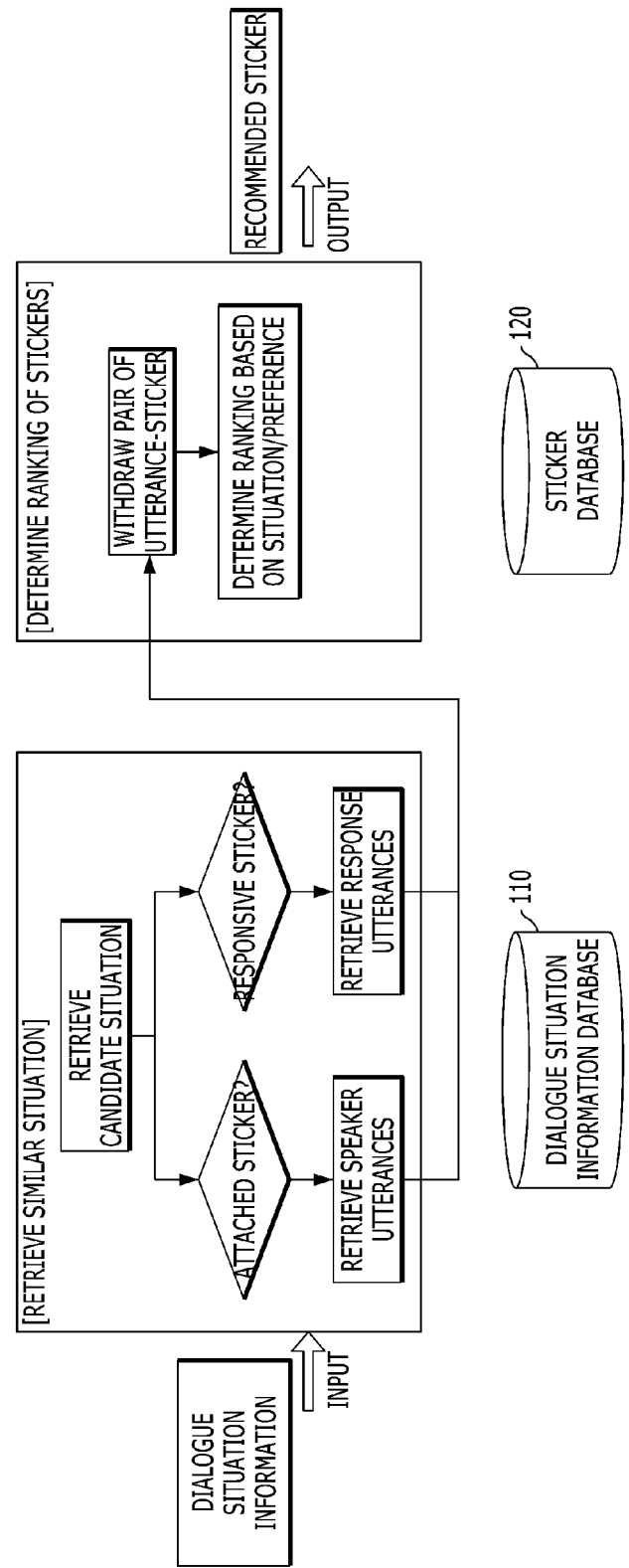
FIG. 10 is a view illustrating a sticker recommendation process.

Hereinafter, a sticker recommendation process will be described in detail with reference to FIG. 10.

When the surface analysis, the dialogue act analysis, and the emotion analysis on the last utterance between the first user and the second user are completed and the dialogue situation information is generated in the dialogue situation analysis process, the server 10 may retrieve a candidate situation from the dialogue situation information database.

Situations having the most probable flow of dialogue act may be arranged and ranked from the dialogue situation database that is already constructed through machine learning to a large amount of corpus.

Thereafter, the server 10 may determine whether the sticker to be recommended is an attached sticker or a responsive sticker.

When a sticker is recommended to the first user terminal 21, a different sticker may be recommended according to whether it is a turn for the first user terminal 21 to respond or an utterance starts a theme.

Thus, according to whether it is a turn for the first user to respond, speaker utterances or response utterances may be retrieved from the dialogue situation data base.

That is, among the utterances stored in the dialogue situation database, utterances starting a theme or responding utterances may be retrieved.

In a sticker ranking determination process, the server 10 may determine the ranking the retrieved utterances in consideration of the preference of a user and the relationship with the other dialogue party.

The utterances stored in the dialogue situation database may be stored in pairs of utterance-sticker, and the retrieval results may be corrected by determining the ranking of the pairs of utterance-sticker that are retrieved.

Hereinafter, a method of recommending a dialogue sticker through similar situation retrieval according to an embodiment of the present invention will be described.

Figure 11:
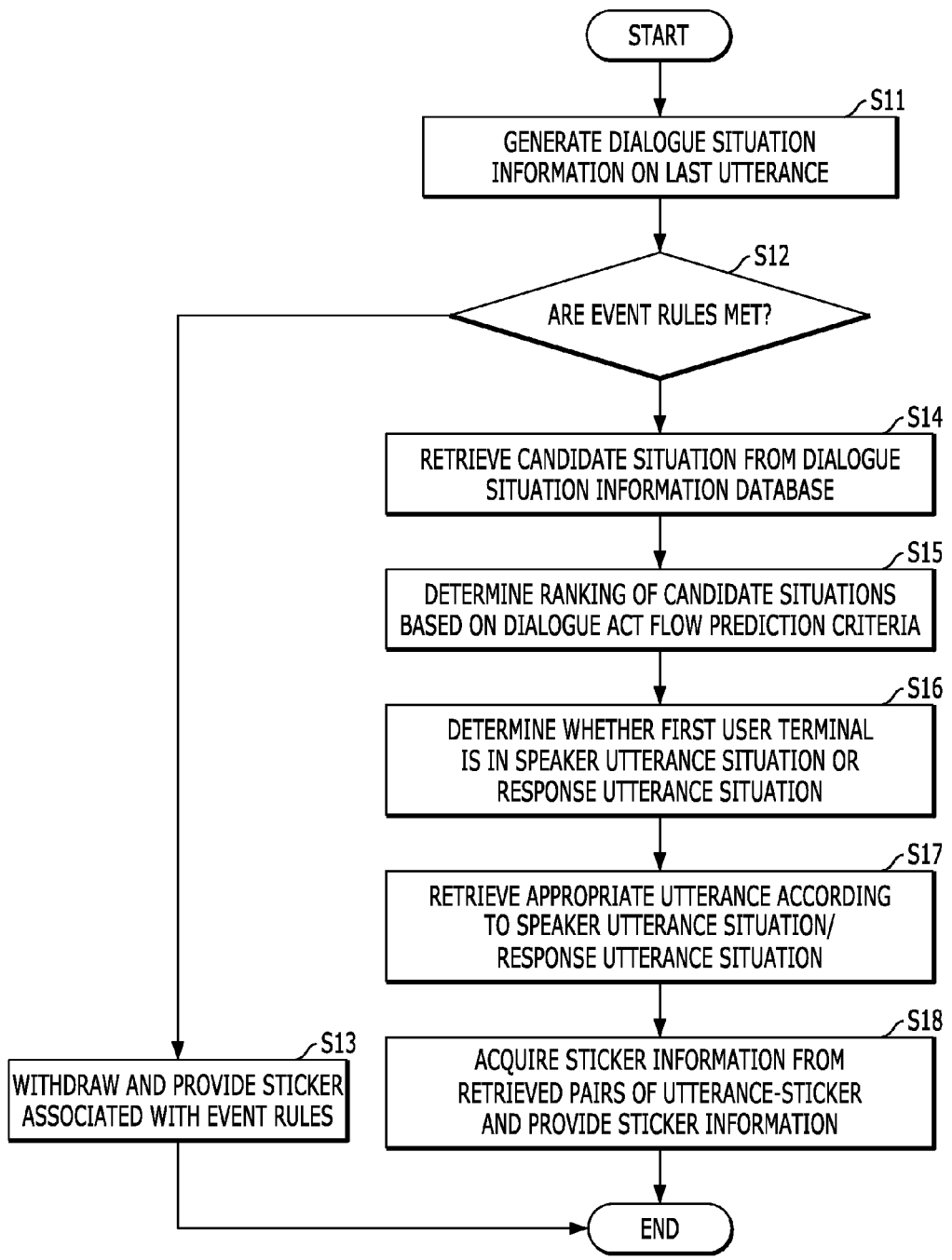
FIG. 11 is a view illustrating a method of recommending a dialogue sticker through similar situation retrieval according to an embodiment of the present invention.

FIG. 11 is a view illustrating a method of recommending a dialogue sticker through similar situation retrieval according to an embodiment of the present invention.

As shown in FIG. 11, the server 10 may generate dialogue situation information on the last utterance between the first user terminal 21 and the second user terminal 22 (S11).

The dialogue situation information of the last utterance may include a surface analysis result, a dialogue act analysis result and emotion analysis result on a certain number of continuous utterances including the last utterance between the first user terminal 21 and the second user terminal 22.

That is, in addition to the surface analysis result or the dialogue act analysis result on the last utterance itself that is a single utterance, the analysis results on a certain number of previous utterances exchanged between the first user and the second user may also be included.

For example, the analysis result on the last six utterances including the last utterance may be included, and the analysis results on all utterances between the first user and the second user may also be included.

The surface analysis result may include keywords and information on morphemes and parts of speech which are acquired through natural language processing on utterances.

The dialogue act analysis result may include dialogue act category (dialogue act information) values acquired through application of a dialogue act classification system.

The emotion analysis result may include emotion type and emotion strength information acquired through application of an emotion classification system.

Thereafter, the server 10 may determined whether or not the dialogue situation information of the last utterance that is analyzed meets event rules that are already defined.

The even rules may mean that the dialogue situation information has a specific value. Each event rule may be stored in a sticker data base 120 in association with sticker information.

That is, each of surface factors (morpheme, parts of speech, etc.), the emotion type, or the dialogue act category included in the dialogue situation information have a specific value, the similar situation retrieval may be omitted, and pre-associated sticker information may be withdrawn to be provided for the first user terminal 21 (S13).

When the feature of the utterance is clear and a further analysis is unnecessary, a predetermined sticker in association with the corresponding event rule may be provided and the procedure may be finished.

If the event rule is not met, the procedure may progress to the next process to retrieve the candidate situation (S14).

A dialogue situation information database 110 may store dialogue situation information on a plurality of continuous utterances through machine learning to a plurality of dialogue act attachment corpuses and emotion attachment corpuses, and in this case, the situation may include a plurality of continuous utterances. That is, this may mean a dialogue including a series of continuous utterances, not a single utterance.

Meanwhile, the plurality of continuous utterances stored in the dialogue situation information database 110 may include pairs of utterance-sticker. That is, the dialogue situation information database 110 may be constructed by analyzing corpuses in which a sticker has been used during a dialogue.

The server 10 may find the candidate situation having the most similar context, using the dialogue situation information on the last utterance.

In this case, the candidate situation having a flow corresponding to a series of dialogue act information included in the dialogue situation information of the last utterance may be retrieved.

Figure 12:
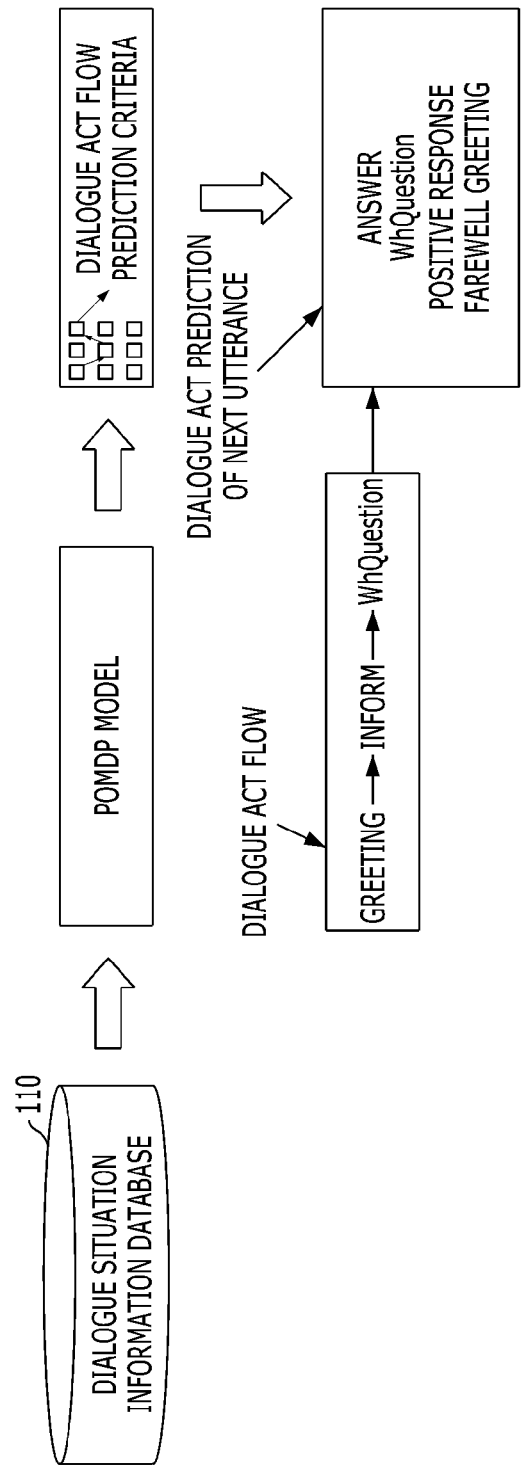
FIG. 12 is a view illustrating a process of determining the ranking of candidate situation in the order of the most probable dialogue act flow from a dialogue situation information database.

FIG. 12 is a view illustrating a process of determining the ranking of candidate situation in the order of the most probable dialogue act flow from a dialogue situation information database.

As shown in FIG. 12, the dialogue act category included in the dialogue situation information of the last utterance may be "greeting->inform->Wh-question".

Accordingly, the server 10 may retrieve, from the dialogue situation information database, a situation in which the dialogue act categories corresponding thereto are sequentially found, i.e., a candidate situation.

In this case, a plurality of candidate situations may be retrieved, but all candidate situations that are retrieved may not match with the dialogue situation of the first user and the second user.

Accordingly, the server 10 may determine the ranking of the candidate situation that are retrieved (S15).

For this, dialogue act flow prediction criteria may be constructed in advance from the dialogue situation information database 110 the by a certain algorithm.

The dialogue act flow prediction criteria may be rules that define which dialogue act category will stochastically follow a specific dialogue act flow, and may be constructed through machine learning by a Partially Observable Markov Decision Processes (POMDP) algorithm.

For example, it may be inferred through machine learning to be able to describe which dialogue act category will follow "greeting->inform->Wh-question".

In the example of FIG. 12, "response" is most likely to follow "greeting->inform->Wh-question", and then it can be predicted that "Wh-question", "confirm response", and "farewell greeting" sequentially will occur.

According to these dialogue act flow prediction criteria, a plurality of candidate situations having a dialogue act flow like "greeting->inform->Wh-question" may be ranked.

That is, a candidate situation followed by a "response" dialogue act category thereafter may be top-ranked.

Next, it may be determined whether the first user terminal 21 is in a speaker utterance situation or a response utterance situation (S16).

The situation may be inferred from the dialogue act flow, and may be determined according to whether the last utterance is from the first user terminal 21 or the second user terminal 22.

When the situation is a speaker utterance situation, i.e., an utterance starting a theme by the first user, the speaker utterances may be retrieved from the ranked candidate situations.

On the other hand, when the situation is a response utterance situation, i.e., a situation that the first user has to response to the utterance of the second user, the response utterances may be retrieved (S17).

The utterance retrieval may be to retrieve utterances attached with stickers, which are utterances corresponding to the last utterance as utterances included in the candidate situation (in case of speaker utterance situation) or next utterances to the last utterance (in case of response utterance situation).

The server 10 may acquire sticker information from the retrieved pairs of utterance-sticker, and may provide the sticker information for the first user terminal (S18).

Meanwhile, during the retrieval of the candidate situation, accordance of dialogue act flows may be mainly determined, but accordance of utterance speaker switching may be further determined.

That is, when dialogue parties exchange dialogue with each other, and the candidate situations are selected, it may be determined whether or not the dialogues of the dialogue situation information database exchange are exchanged similarly to the exchange order of dialogues between the first user and the second user.

This is because the context can be accurately compared only when dialogue act information and emotion information which the utterances of the other dialogue party have are considered after an utterance having specific dialogue act information and emotion information occurs, in addition to the analysis on dialogue act information and emotion information of a specific user.

Meanwhile, during the retrieval of the candidate situation, the relationship between dialogue parties may be considered in addition to the determination of accordance of dialogue act flows.

The relationship between the first user and the second user may be inferred from the last utterance. The relationship may be analyzed with intimacy and relationship between subordinates and superiors, and may be inferred in accordance with whether unceremonious words are used or whether honorific words or plain words are used.

Meanwhile, dialogues between dialogue parties in identical relation with the candidate situation retrieval may be mainly retrieved from the dialogue situation information database.

The method according to the embodiment of the present invention can also be embodied into a form of program instruction executable through various computer means, and can be recorded on computer readable media. The computer readable media may include program instructions, data files, data structures, or combinations thereof. The program instructions recorded in the media may be what is specially designed and constructed for the present invention, or may be what is well-known to computer software engineers skilled in the art. Examples of computer readable recording media include hard disk, magnetic media such as floppy disks and magnetic tapes, optical media such as CD-ROM and DVD, magneto-optical media such as floptical disk, and hardware devices such as ROM, RAM, and flash memory, which are specially configured so as to store and perform program instructions. Examples of program instructions may include high-level language codes which can be executed by computers using an interpreter and the like, as well as machine language codes which are made by a compiler.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

According to the embodiments, although an identical dialogue content or keyword is inputted, different stickers can be appropriately recommended in accordance with the dialogue context and situation. That is, compared to algorithms of automatically recommending a sticker through simple keyword matching, a more appropriate sticker can be recommended.

Particularly, the situation suitability of sticker recommendation can be ensured by determining the ranking candidate pairs of utterance-sticker based on the most probably dialogue act flow from the past dialogue situation information database using dialogue situation information on inputted utterances and determining the ranking of the candidate pairs of utterance-sticker according to whether the utterance starts a theme or corresponds to a response.

The present invention can be applied to social network service and messenger technical fields.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of recommending a dialogue sticker through similar situation retrieval by use of a server that is connected to a first user terminal and a second user terminal through a network and relays an utterance inputted to a messenger between the first user terminal and the second user terminal, the utterance including at least one of a text and an image, the method comprising:
  generating a dialogue situation information database that includes multiple situations, each of the situations including a plurality of pairs that each include an utterance and a sticker, the utterances in each of the situations including a plurality of contiguous utterances from two terminals;
  generating dialogue situation information based on utterances that include a last utterance of the first user terminal and a last utterance of the second user terminal;
  retrieving a candidate situation having a most similar context as the generated dialogue situation information from the dialogue situation information database;
  determining whether the first user terminal is in a speaker utterance situation or a response utterance situation;
  retrieving, from the candidate situation, a pair that includes a speaker utterance when the first user terminal is in the speaker utterance situation and retrieving, from the candidate situation, a pair that includes a response utterance when the first user terminal is in the response utterance situation; and
  providing the sticker in the retrieved pair on a display device of the first user terminal.

2. A non-transitory computer readable medium storing one or more sequences of pattern data for recommending a dialogue sticker by use of a server that is connected to a database, a first user terminal and a second user terminal through a network and relays an utterance inputted to a messenger between the first user terminal and the second user terminal, the utterance including at least one of a text and an image, wherein execution of the one or more sequences of the pattern data by one or more processors causes the one or more processors to perform the steps of:
  generating a dialogue situation information database that includes multiple situations, each of the situations including a plurality of pairs that each include an utterance and a sticker, the utterances in each of the situations including a plurality of contiguous utterances from two terminals;
  generating dialogue situation information based on based on utterances that include a last utterance of the first user terminal and a last utterance of the second user terminal;
  retrieving a candidate situation having a most similar context as the generated dialogue situation information from the dialogue situation information database;
  determining whether the first user terminal is in a speaker utterance situation or a response utterance situation;
  retrieving, from the candidate situation, a pair that includes a speaker utterance when the first user terminal is in the speaker utterance situation and retrieving, from the candidate situation, a pair that includes a response utterance when the first user terminal is in the response utterance situation; and
  providing the sticker in the retrieved pair on a display device of the first user terminal.

3. The non-transitory computer readable medium of claim 2, wherein the retrieving of the candidate situation comprises retrieving a situation having continuous utterances that match a flow of dialogue act of the last utterances inputted by the first and second user terminals from the dialogue situation information database.

4. The computer program non-transitory computer readable medium of claim 3, wherein the retrieving of the candidate situation comprises retrieving a situation that matches a relationship between a first user of the first user terminal and a second user of the second user terminal from the dialogue situation information database when inferring the relationship between the first user and the second user from the generated dialogue situation information.

* * * * *